(12) United States Patent
Usa

(10) Patent No.: US 9,939,906 B2
(45) Date of Patent: Apr. 10, 2018

(54) COMBINER AND OPERATION DETECTION DEVICE

(71) Applicant: FUJITSU COMPONENT LIMITED, Tokyo (JP)

(72) Inventor: Hiroki Usa, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 170 days.

(21) Appl. No.: 14/468,427

(22) Filed: Aug. 26, 2014

(65) Prior Publication Data

US 2015/0084856 A1    Mar. 26, 2015

(30) Foreign Application Priority Data

Sep. 25, 2013   (JP) ................. 2013/198999

(51) Int. Cl.
| | |
|---|---|
| *G06F 3/045* | (2006.01) |
| *G06F 3/01* | (2006.01) |
| *G02B 27/01* | (2006.01) |
| *B60K 35/00* | (2006.01) |
| *G06F 3/041* | (2006.01) |
| *G06F 3/044* | (2006.01) |

(52) U.S. Cl.
CPC ............ *G06F 3/017* (2013.01); *B60K 35/00* (2013.01); *G02B 27/0101* (2013.01); *G06F 3/044* (2013.01); *G06F 3/0412* (2013.01); *B60K 2350/1012* (2013.01); *B60K 2350/1052* (2013.01); *G06F 2203/04109* (2013.01)

(58) Field of Classification Search
CPC .......... G06F 2203/04111; G06F 3/017; G06F 3/0304; G06F 3/0412; G06F 3/044; G06F 2203/04109; G02B 27/0101–2027/0147; B60K 35/00; B60K 2350/1012; B60K 2350/1052
See application file for complete search history.

(56) References Cited

U.S. PATENT DOCUMENTS

| | | | |
|---|---|---|---|
| 5,859,714 | A | 1/1999 | Nakazawa et al. |
| 2008/0141127 | A1 | 6/2008 | Yamamoto et al. |
| 2010/0090948 | A1 | 4/2010 | Oba et al. |
| 2010/0102941 | A1 | 4/2010 | Richter et al. |

(Continued)

FOREIGN PATENT DOCUMENTS

| | | |
|---|---|---|
| CN | 101080691 | 11/2007 |
| DE | 102009046376 A1 | 5/2011 |

(Continued)

OTHER PUBLICATIONS

Patent Abstracts of Japan, Publication No. 2010-092420, published Apr. 22, 2010.

(Continued)

*Primary Examiner* — Roberto Flores
*Assistant Examiner* — Aaron Midkiff
(74) *Attorney, Agent, or Firm* — Staas & Halsey LLP

(57) ABSTRACT

A combiner that reflects a light projected by a projector toward an operator, includes: a reflection layer that reflects the light projected by the projector; an electric field generation layer that generates an electric field around the combiner; and an output layer that outputs a voltage according to change of the electric field generated by the field generation layer.

5 Claims, 9 Drawing Sheets

(56) References Cited

U.S. PATENT DOCUMENTS

| | | | |
|---|---|---|---|
| 2011/0304576 A1 | 12/2011 | Fasshauer | |
| 2012/0105370 A1 | 5/2012 | Moore | |
| 2012/0173067 A1 | 7/2012 | Szczerba et al. | |
| 2013/0076615 A1* | 3/2013 | Iao | G06F 3/017 345/156 |
| 2013/0135252 A1 | 5/2013 | Oba et al. | |
| 2013/0154995 A1* | 6/2013 | Trend | G06F 3/044 345/174 |
| 2013/0176236 A1 | 7/2013 | Ivanov | |
| 2014/0198077 A1 | 7/2014 | Oba et al. | |
| 2015/0304642 A1* | 10/2015 | Kim | G03H 1/2202 348/40 |

FOREIGN PATENT DOCUMENTS

| | | |
|---|---|---|
| JP | 4-362426 | 12/1992 |
| JP | 8-76050 | 3/1996 |
| JP | 2005-138755 | 6/2005 |
| JP | 2010-92420 | 4/2010 |
| JP | 2010-522492 | 7/2010 |
| JP | 2010-182201 | 8/2010 |
| JP | 2010-244132 | 10/2010 |
| JP | 2013-519930 | 5/2013 |
| TW | 201032473 | 9/2010 |
| WO | 2013/100325 | 7/2013 |

OTHER PUBLICATIONS

Patent Abstracts of Japan, Publication No. 2010-182201, published Aug. 19, 2010.
Espacenet English Abstract of Taiwanese Publication No. 201032473, published Sep. 1, 2010.
Taiwanese Office Action for corresponding Taiwanese Patent Application No. 103133335, dated Nov. 12, 2015, 6 pages.
Espacenet English Abstract of German Publication No. 102009046376 A1, Published May 5, 2011.
Extended European Search Report dated Feb. 20, 2015 in corresponding European Patent Application No. 14183915.9.
Izadi et al., "ThinSight: A Thin Form-Factor Interactive Surface Technology", Communications of the ACM, vol. 52, No. 12, Dec. 2009, pp. 90-98.
Chinese Office Action dated Jan. 19, 2017 in corresponding Chinese Patent Application No. 201410496141.7, 7 pages.
Japanese Office Action dated Apr. 18, 2017 in corresponding Japanese Patent Application No. 2013-198999, 3 pages.

* cited by examiner

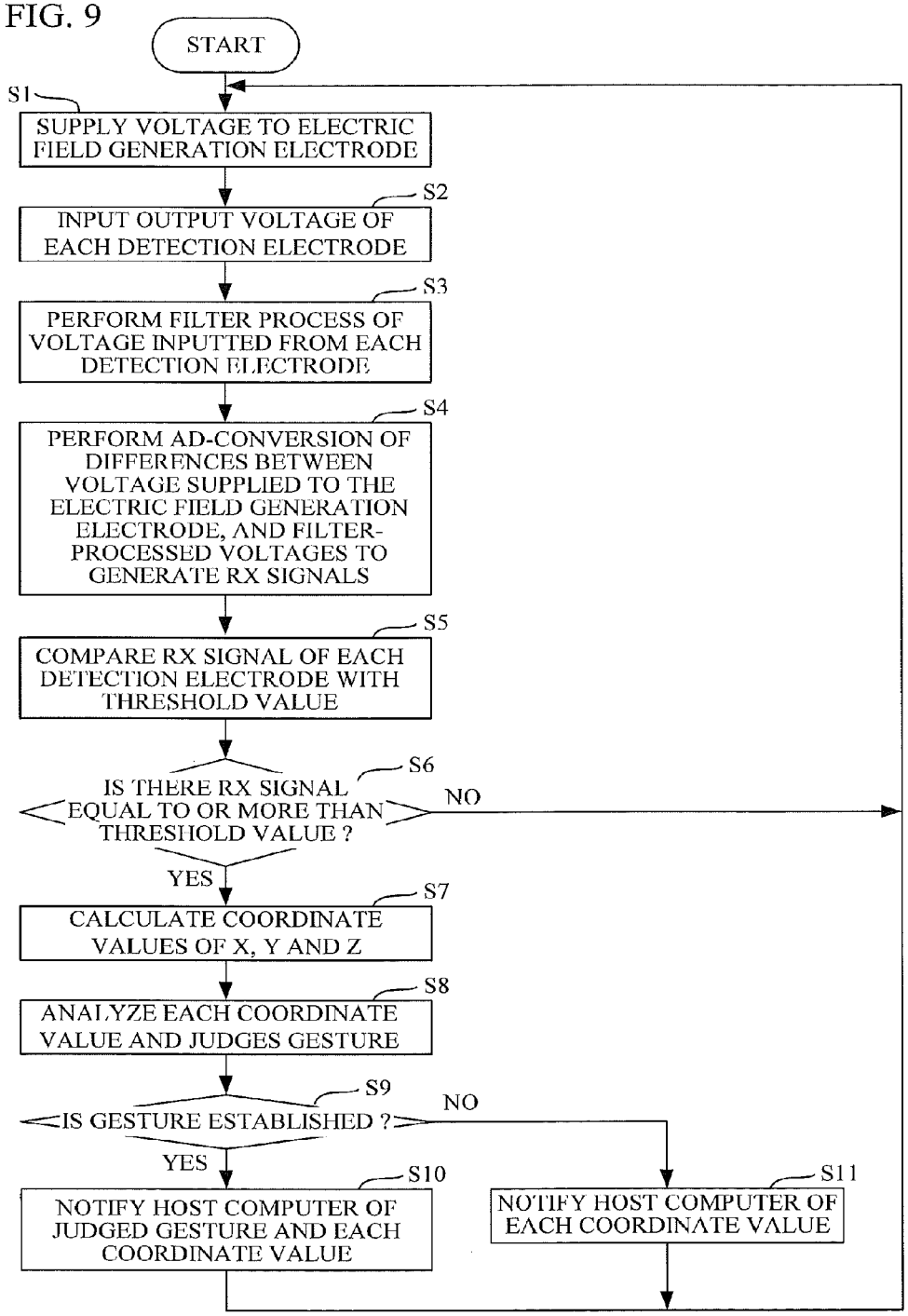

COMBINER AND OPERATION DETECTION DEVICE

CROSS-REFERENCE TO RELATED APPLICATION

This application is based upon and claims the benefit of priority of the prior Japanese Patent Application No. 2013-198999 filed on Sep. 25, 2013, the entire contents of which are incorporated herein by reference.

FIELD

A certain aspect of the embodiments is related to a combiner and an operation detection device.

BACKGROUND

There has been known an input device which inputs operation information to display information displayed on a display screen, without removing an operator's sight line from the display screen. In the input device, gesture operation of the operator is captured with a camera, the captured moving image is analyzed, and an operation input by the operator is judged. Moreover, there has been known a technique that judges operation input by the operator by detecting gesture operation of the operator with an infrared sensor.

There has been known an electrostatic capacitance type detection sensor as a sensor which detects operation input by the operator (see Japanese Laid-open Patent Publication No. 2010-92420 and Japanese Laid-open Patent Publication No. 2010-182201).

SUMMARY

According to an aspect of the present invention, there is provided a combiner that reflects a light projected by a projector toward an operator, including: a reflection layer that reflects the light projected by the projector; an electric field generation layer that generates an electric field around the combiner; and an output layer that outputs a voltage according to change of the electric field generated by the field generation layer.

According to another aspect of the present invention, there is provided an operation detection device including: a combiner that reflects a light projected by a projector toward an operator; and a judgment device; the combiner including: a reflection layer that reflects the light projected by the projector; an electric field generation layer that generates an electric field around the combiner; and an output layer that outputs a voltage according to change of the electric field generated by the field generation layer; and the judgment device including: a voltage supply circuit that supplies a voltage to the electric field generation layer; a voltage input circuit that inputs a voltage from the output layer; and a detector that detects a non-contact operation content by the operator based on a signal corresponding to a difference between the voltage supplied to the electric field generation layer and the voltage from the output layer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a flowchart illustrating a processing procedure of the judgment device.

DESCRIPTION OF EMBODIMENTS

In the conventional technology, when the gesture of the operator is judged with the camera and the infrared sensor, the camera and the infrared sensor must be provided separately, and hence the cost of a device becomes expensive and electrical power consumption becomes large. The judgment of the gesture using an image captured with the camera needs to perform complicated image analysis including a noise elimination technology of a disturbance light.

A description will now be given of a preferable embodiment of the present invention with reference to the drawings.

Figure 1:
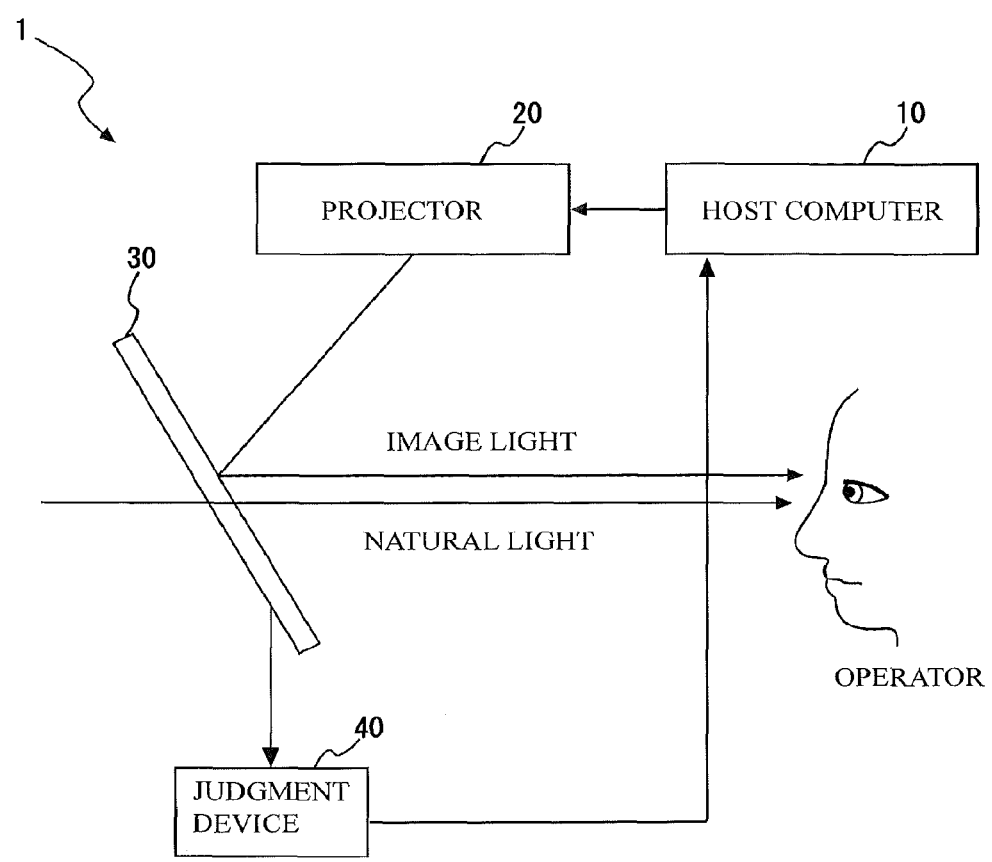
FIG. 1 is a diagram illustrating an example of the configuration of a head-up display.

A description will be given of a head-up display 1 with reference to FIG. 1. The head-up display 1 is a device which can directly project information on a human's view, projects information such as a projected image on a combiner including a hologram or a half mirror, and can show a virtual image to an operator as if the information floats in the air. The head-up display 1 is applied to a car navigation system mounted in a vehicle, or a medical information display system that displays a CT (Computed Tomographic) scanning image and an X-ray image.

The head-up display 1 includes a host computer 10, a projector 20, a combiner 30, and a judgment device 40. The host computer 10 supplies image data to the projector 20. When the head-up display 1 is applied to a car navigation system mounted in a vehicle, for example, the host computer 10 serves as a navigation device body.

The projector 20 projects the image data supplied from the host computer 10, toward the combiner 30. When the head-up display 1 is mounted in the vehicle, for example, a traveling speed and various warning indication, or various data and map information that are intended to display based on various application prepared for beforehand are included in the image data.

The combiner 30 penetrates a part of an incident light and reflects a remaining part of the incident light, so that it simultaneously leads an image which the projector 20 projects and a natural light to operator's eyes. The combiner 30 has a so-called function of a half mirror. An example of the detailed configuration of the combiner 30 is mentioned later.

Figure 2:
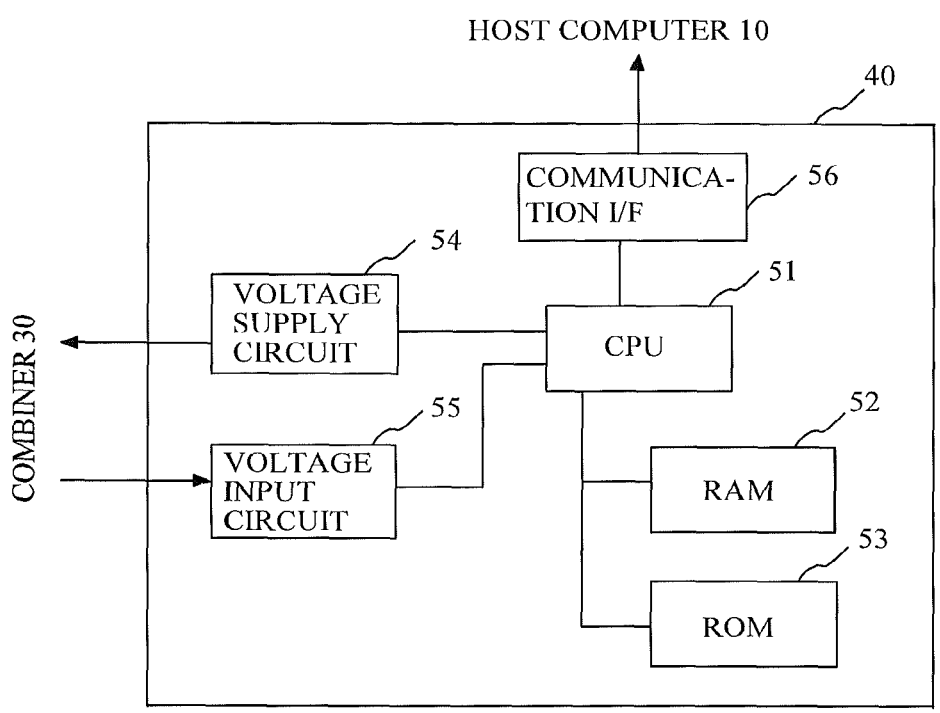
FIG. 2 is a schematic diagram illustrating the configuration of a judgment device.

The judgment device 40 judges the operation such as the gesture of the operator, and outputs a judgment result to the host computer 10. FIG. 2 is a schematic diagram illustrating the configuration of the judgment device 40. The judgment device 40 includes: a CPU 51 that controls the operation of the entire device; a RAM 52 that is a working memory; a ROM 53 that stores programs and data; a voltage supply circuit 54 that supplies a voltage to the combiner 30; a voltage input circuit 55 that inputs an output voltage from the combiner 30; and a communication interface (I/F) 56 that communicates with the host computer 10. The CPU 51 is connected to the RAM 52, the ROM 53, the voltage supply circuit 54, the voltage input circuit 55 and the communication I/F 56. The voltage input circuit 55 includes a ground terminal, not shown. The CPU 51 performs a filter process, an A/D conversion process and so on as mentioned later to a voltage signal (an output voltage) inputted from the combiner 30 via the voltage input circuit 55. Here, in FIG. 1, the host computer 10 and the judgment device 40 are provided as discrete devices, but the judgment device 40 may be achieved by the host computer 10.

Figure 3:
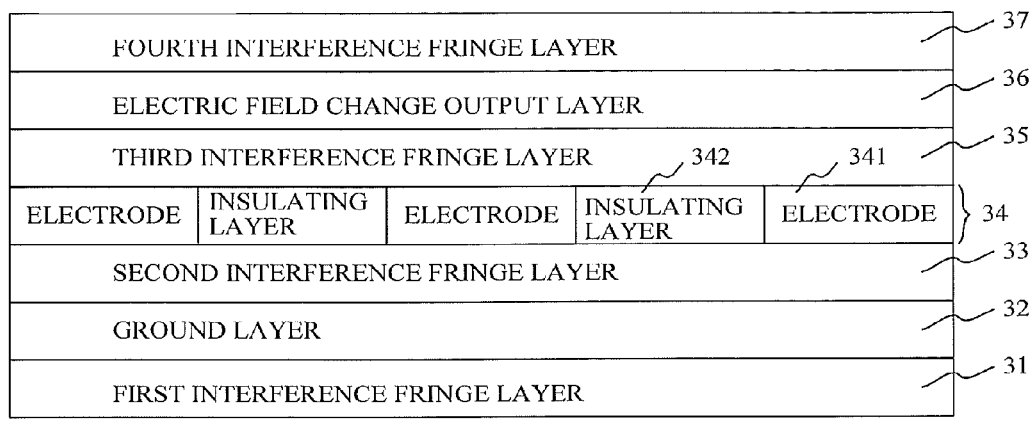
FIG. 3 is a cross-section diagram illustrating an example of the configuration of a combiner.

Next, a description will be given of an example of the detailed configuration of the combiner 30 with reference to FIG. 3. FIG. 3 is a cross-section diagram illustrating an example of the configuration of the combiner 30. An upper side of FIG. 3 is an operator side. The combiner 30 includes a first interference fringe layer 31, a ground layer 32, a second interference fringe layer 33, an electric field generation layer 34, a third interference fringe layer 35, an electric field change output layer 36, and a fourth interference fringe layer 37. The electric field generation layer 34 includes electric field generation electrodes 341 and insulating layers 342. The electric field change output layer 36 includes a plurality of electric field detection electrodes mentioned later.

Each of the first interference fringe layer 31, the second interference fringe layer 33, the third interference fringe layer 35 and the fourth interference fringe layer 37 which functions as a reflection layer penetrates a part of the incident light and reflects the image projected from the projector 20. Here, the combiner does not necessarily need to have four interference fringe layers. It is desirable that the combiner has at least two interference fringe layers. Moreover, instead of the interference fringe layer, a certain reflection layer having a function that penetrates a part of the incident light and reflects the image from the projector 20 may be provided. When the electric field change output layer 36 is too near the electric field generation layer 34, it is easy to generate a noise on a voltage which the judgment device 40 inputs from the electric field generation layer 34. Therefore, it is desirable that the interference fringe layer (i.e., the third interference fringe layer 35) is provided between the electric field generation layer 34 and the electric field change output layer 36. Here, instead of a part of the interference fringe layers and the reflection layers, a layer having a function that penetrates the light may be provided.

Figure 4:
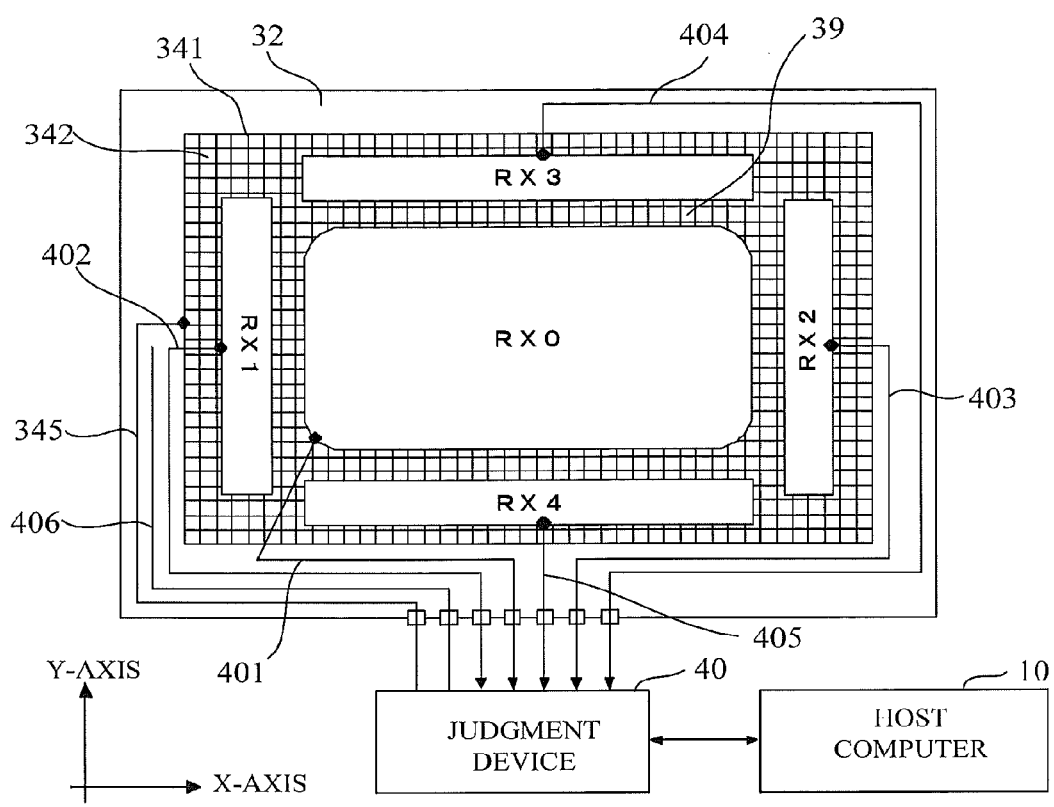
FIG. 4 is a diagram illustrating electrical connection configuration between the combiner and a host computer.

FIG. 4 is a diagram illustrating electrical connection configuration between the combiner 30 and the host computer 10. It is assumed that, for convenience of explanation, the lower left of a drawing is an original point, a transverse direction of the combiner 30 is an X-axis, and a longitudinal direction of the combiner 30 is a Y-axis. In the combiner 30 illustrated in FIG. 4, the electric field generation layer 34 having the electric field generation electrodes 341 and the insulating layers 342 is formed on the ground layer 32 as a pattern. Here, in FIG. 4, the electric field generation electrodes 341 are illustrated by mesh patterns, and each of the insulating layers 342 illustrated with quadrangles is formed between the electric field generation electrodes 341 of the mesh patterns. The electric field generation electrodes 341 are connected to the judgment device 40 via a wiring 345. The ground layer 32 is connected to the judgment device 40 via a wiring 406.

Moreover, the electric field change output layer 36 is formed on an upper surface of the electric field generation layer 34. The electric field change output layer 36 includes five electric field detection electrodes RX0, RX1, RX2, RX3 and RX4 (hereinafter, referred to as a detection electrode). Since the combiner 30 is seen from above in FIG. 4, the electric field generation electrodes 341, the ground layer 32 and the detection electrodes RX0, RX1, RX2, RX3, and RX4 are illustrated on the same plane. The detection electrode RX0 is formed on a central domain of the combiner 30, and is connected to the judgment device 40 via a wiring 401. The detection electrode RX1 is formed on a left end of the X-axis of the combiner 30 illustrated in FIG. 4, and is connected to the judgment device 40 via a wiring 402. The detection electrode RX2 is formed on a right end of the X-axis of the combiner 30 illustrated in FIG. 4, and is connected to the judgment device 40 via a wiring 403. The detection electrode RX3 is formed on a top end of the Y-axis of the combiner 30 illustrated in FIG. 4, and is connected to the judgment device 40 via a wiring 404. The detection electrode RX4 is formed on a bottom end of the Y-axis of the combiner 30 illustrated in FIG. 4, and is connected to the judgment device 40 via a wiring 405. The insulating layers 39 are formed between the detection electrodes RX0, RX1, RX2, RX3 and RX4 of the electric field change output layer 36, respectively. That is, the electric field change output layer 36 includes the insulating layers 39 in addition to the detection electrodes RX0, RX1, RX2, RX3 and RX4.

The voltage supply circuit 54 of the judgment device 40 is connected to the electric field generation electrodes 341 via the wiring 345, and supplies an alternating voltage to the electric field generation electrodes 341. The voltage supply circuit 54 supplies a pulse voltage of a square wave to the electric field generation electrode 341, for example. A voltage that is proportional to the alternating voltage supplied to the electric field generation electrode 341 and is smaller than the alternating voltage flows into each of the detection electrodes RX0, RX1, RX2, RX3 and RX4. When the finger of the operator with the role of a ground is brought close to any one of the detection electrodes RX0, RX1, RX2, RX3 and RX4, an electric field near an electrode to which the finger is brought close is changed, and a voltage detected with the detection electrode to which the finger is brought close is reduced.

The CPU 51 of the judgment device 40 judges the detection electrode which the finger of the operator approaches, based on a difference between a voltage supplied to the electric field generation electrodes 341 and a voltage outputted from each of the detection electrodes RX0, RX1, RX2, RX3 and RX4. The voltage outputted from each of the detection electrodes RX0, RX1, RX2, RX3 and RX4 reduces according to a distance between the finger which the operator brings close to the detection electrode, and each of the detection electrodes RX0, RX1, RX2, RX3 and RX4. The more the finger of the operator approaches any one of the detection electrodes, the larger the decrement of the voltage outputted from the detection electrode becomes. The CPU 51 generates a signal (hereinafter referred to as "a RX signal") according to a difference between the voltage supplied to the electric field generation electrodes 341 and the voltage outputted from each of the detection electrodes RX0, RX1, RX2, RX3 and RX4, and judges the gesture of the operator based on the generated RX signal.

Figure 5A:
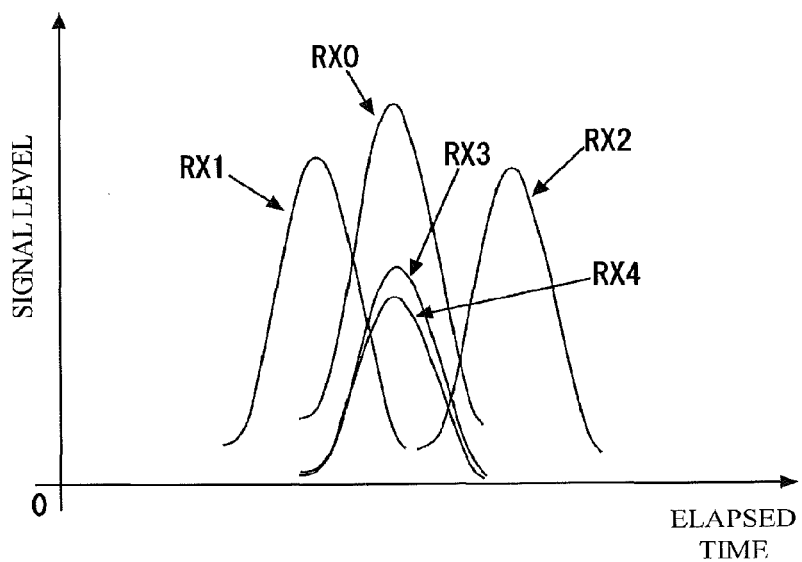
FIG. 5A is a diagram illustrating signal levels of RX signals which the judgment device detects when a gesture which moves a finger from left to right is performed.
Figure 5B:
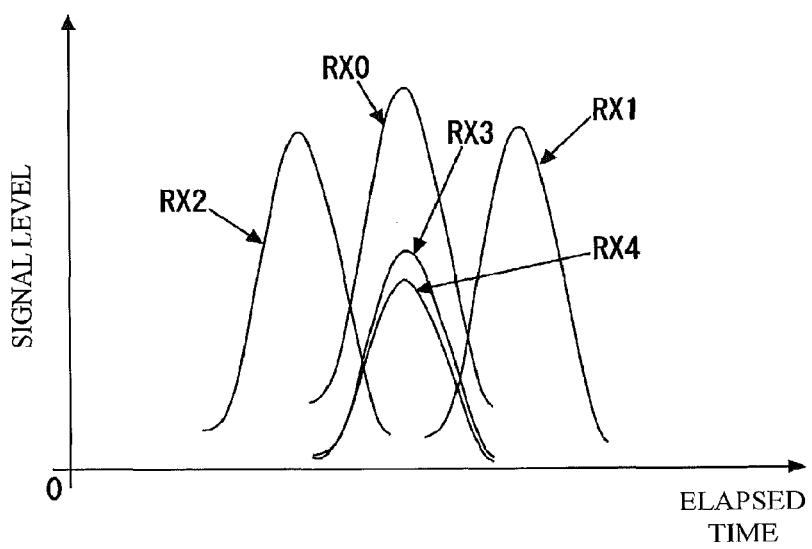
FIG. 5B is a diagram illustrating signal levels of the RX signals which the judgment device detects when a gesture which moves the finger from right to left is performed.

FIG. 5A illustrates signal levels of the RX signals outputted from the respective detection electrodes which the judgment device 40 detects when the operator performs a gesture which moves the finger from a left end to a right end of the combiner 30. Here, it is assumed that the finger passes the areas of the detection electrodes RX1, RX0 and RX2 in this order. In this case, the CPU 51 first detects a level of the RX signal based on a voltage inputted from the detection electrode RX1. Then, the CPU 51 detects a level of the RX signal based on a voltage inputted from the detection electrode RX0. Here, when the position of the finger moves to the area of the detection electrode RX0, the CPU 51 detects levels of the RX signals based on voltages inputted from the detection electrodes RX3 and RX4, respectively. This is because a distance between the finger and the area of the detection electrode RX3 and a distance between the finger and the area of the detection electrode RX4 become short. Finally, the CPU 51 detects a level of the RX signal inputted from the detection electrode RX2. FIG. 5B illustrates signal levels of the RX signals which the judgment device 40 detects when the operator performs a gesture which moves the finger from the right end to the left end of the combiner 30. In the case of FIG. 5B, contrary to the case of FIG. 5A, the CPU 51 first detects the level of the RX signal from the detection electrode RX2.

Figure 6A:
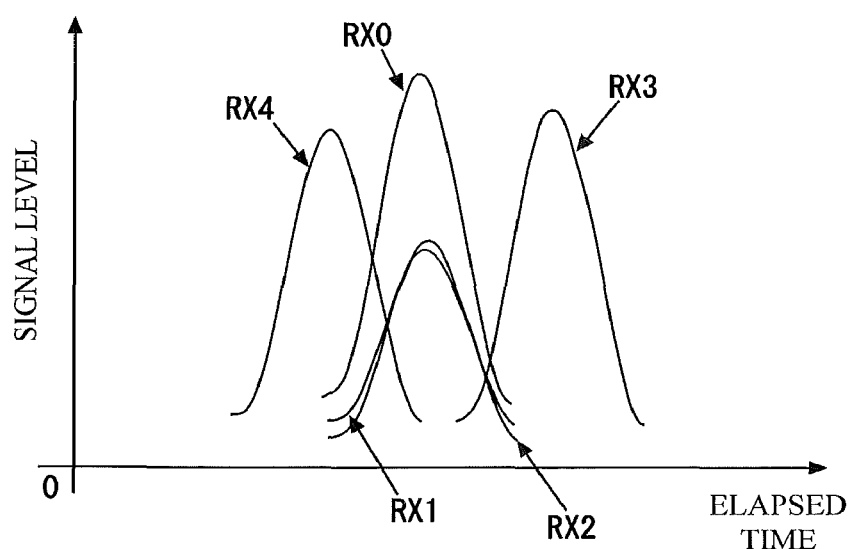
FIG. 6A is a diagram illustrating signal levels of the RX signals which the judgment device detects when a gesture which moves the finger from bottom to top is performed.
Figure 6B:
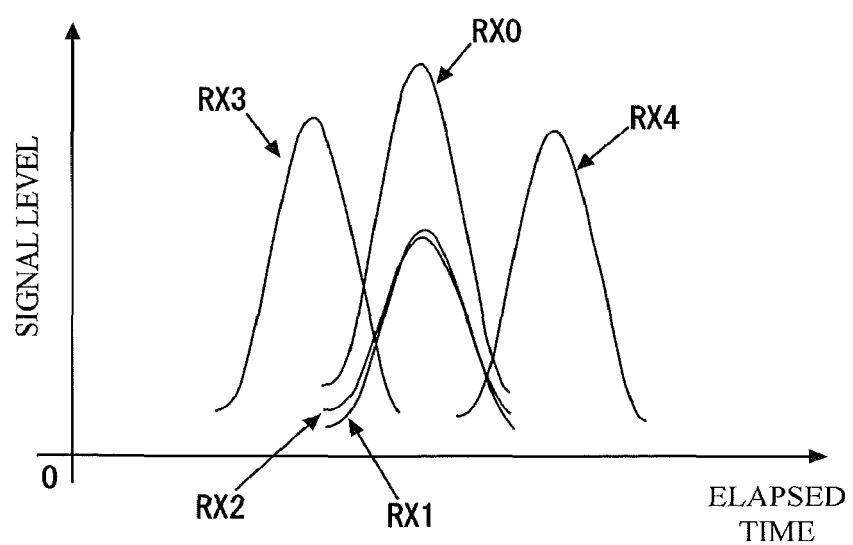
FIG. 6B is a diagram illustrating signal levels of the RX signals which the judgment device detects when a gesture which moves the finger from top to bottom is performed.

FIG. 6A illustrates signal levels of the RX signals which the judgment device 40 detects when the operator performs a gesture which moves the finger from a bottom end to a top end of the combiner 30. Here, it is assumed that the finger passes the areas of the detection electrodes RX4, RX0 and RX3 in this order. In this case, the CPU 51 first detects a level of the RX signal based on a voltage inputted from the detection electrode RX4. Then, the CPU 51 detects a level of the RX signal based on a voltage inputted from the detection electrode RX0. Here, when the position of the finger moves to the area of the detection electrode RX0, the CPU 51 detects levels of the RX signals based on voltages inputted from the detection electrodes RX1 and RX2, respectively. Finally, the CPU 51 detects a level of the RX signal inputted from the detection electrode RX3. FIG. 6B illustrates signal levels of the RX signals which the judgment device 40 detects when the operator performs a gesture which moves the finger from the top end to the bottom end of the combiner 30. In the case of FIG. 6B, contrary to the case of FIG. 6A, the CPU 51 first detects the level of the RX signal from the detection electrode RX3.

Figure 7A:
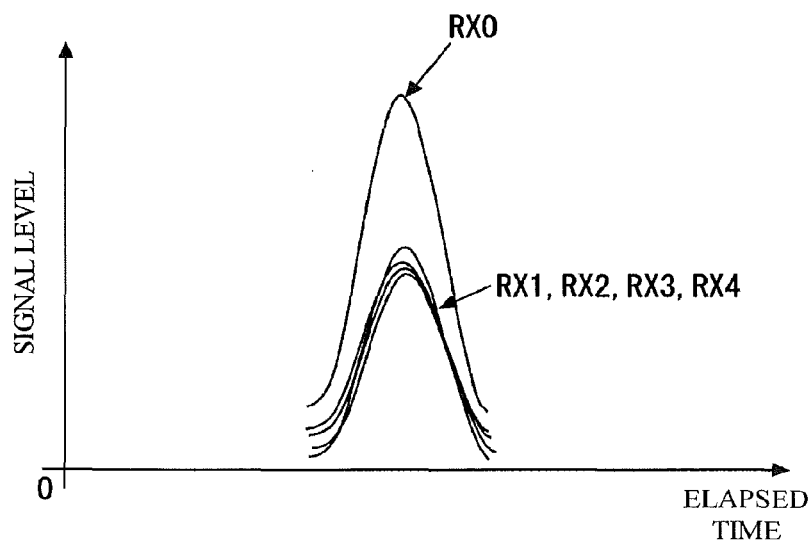
FIG. 7A is a diagram illustrating signal levels of the RX signals which the judgment device detects when a gesture which brings the finger close to the combiner is performed.

FIG. 7A illustrates signal levels of the RX signals which the judgment device 40 detects when the finger of the operator approaches the combiner 30 in a vertical direction in the center of the area of the detection electrode RX0. In this case, the CPU 51 detects signal levels of the RX signals based on respective voltages of the detection electrodes RX0, RX1, RX2, RX3 and RX4. And, the level of the RX signal based on the voltage inputted from the detection electrode RX0 becomes a maximum value as the finger approaches the detection electrode RX0.

Figure 7B:
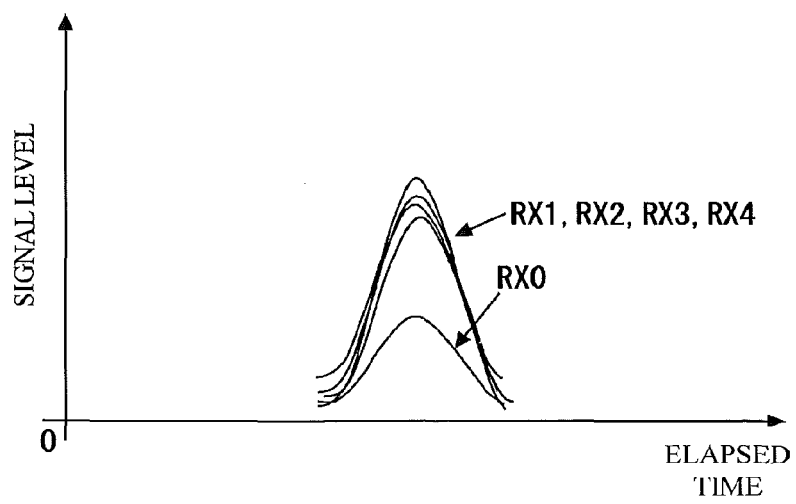
FIG. 7B is a diagram illustrating signal levels of the RX signals which the judgment device detects when a gesture which goes away the finger from the combiner is performed.

FIG. 7B illustrates signal levels of the RX signals which the judgment device 40 detects when the finger of the operator goes away from the combiner 30 in the vertical direction in the center of the area of the detection electrode RX0. In this case, the CPU 51 detects signal levels of the RX signals based on respective voltages of the detection electrodes RX0, RX1, RX2, RX3 and RX4. And, the level of the RX signal based on the voltage inputted from the detection electrode RX0 becomes a minimum value as the finger goes away from the detection electrode RX0.

Figure 8A:
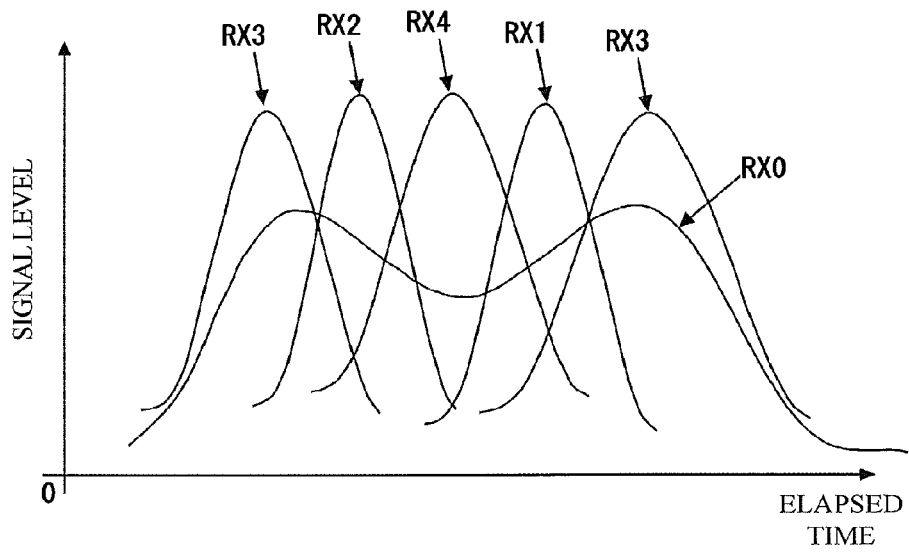
FIG. 8A is a diagram illustrating signal levels of the RX signals which the judgment device detects when a gesture which rotates the finger in a clockwise direction is performed.
Figure 8B:
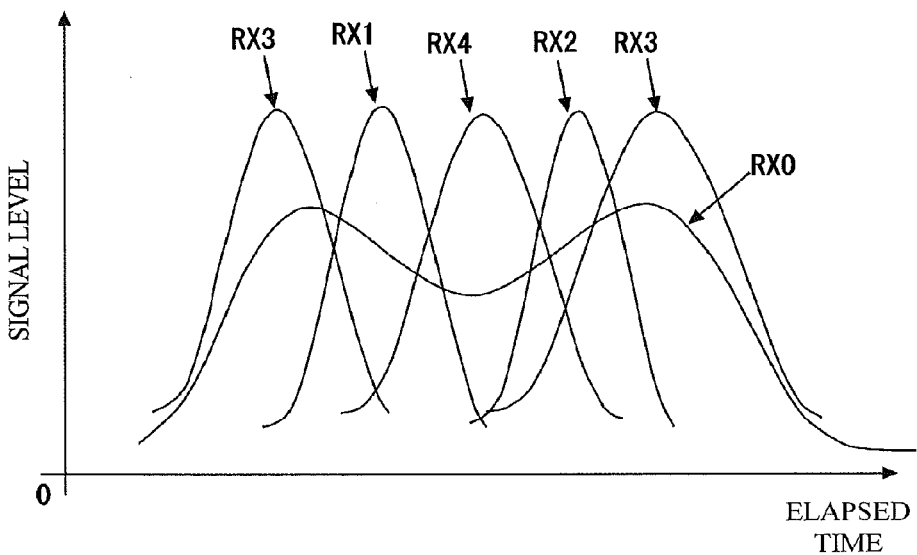
FIG. 8B is a diagram illustrating signal levels of the RX signals which the judgment device detects when a gesture which rotates the finger in a counterclockwise direction is performed.

FIG. 8A illustrates signal levels of the RX signals which the judgment device 40 detects when the operator performs circular motion of the finger on the areas of the detection electrodes RX3, RX2, RX4 and RX1 in this order. In this case, the CPU 51 first detects a level of the RX signal based on a voltage inputted from the detection electrode RX3. Next, the CPU 51 detects a level of the RX signal based on a voltage inputted from the detection electrode RX2. Then, the CPU 51 detects a level of the RX signal based on a voltage inputted from the detection electrode RX4. Finally, the CPU 51 detects a level of the RX signal based on a voltage inputted from the detection electrode RX1. Here, since the finger does not pass the area of the detection electrodes RX0, the level of the RX signal based on the voltage inputted from the detection electrode RX0 is smaller than the signal levels of the detection electrodes RX3, RX2, RX4 and RX1. Here, FIG. 8B illustrates signal levels of the RX signals which the judgment device 40 detects when the operator performs circular motion of the finger on the areas of the detection electrodes RX3, RX1, RX4 and RX2 in this order, i.e., in an opposite direction of FIG. 8A.

Next, a description will be given of a processing procedure of the judgment device with reference to a flowchart illustrated in FIG. 9. First, the voltage supply circuit 54 of the judgment device 40 supplies a voltage to the electric field generation electrode 341 (step S1). Specifically, the voltage supply circuit 54 supplies the pulse voltage of the square wave to the electric field generation electrode 341. The voltage input circuit 55 of the judgment device 40 inputs an output voltage of each of the detection electrodes RX0, RX1, RX2, RX3 and RX4 (step S2). Next, the CPU 51 of the judgment device 40 performs the filter process of the inputted voltage of each of the detection electrodes RX0, RX1, RX2, RX3 and RX4 to remove a noise (step S3). The CPU 51 performs AD-conversion of differences between the voltage supplied to the electric field generation electrode 341, and the filter-processed voltages to generate the RX signals (step S4). Next, the CPU 51 compares the RX signals of the detection electrodes RX0, RX1, RX2, RX3 and RX4 with a threshold value (step S5). The threshold value is a value for judging whether each RX signal is an effective input, and is stored into the RAM 52 or the ROM 53 beforehand. The threshold value can be changed with the use of the host computer 10. The CPU 51 shifts to the process of step S7 when there is at least one RX signal equal to or more than the threshold value (YES in step S6), and the CPU 51 returns to the process of step S1 when there is no RX signal equal to or more than the threshold value (NO in step S6).

In the process of step S7, the CPU 51 calculates coordinate values of X, Y and Z directions which indicate a position of the finger using the RX signals. It is assumed that, in this example, a horizontal direction of the combiner 30 illustrated in FIG. 3 is set as an X-axis, a longitudinal direction of the combiner 30 is set as a Y-axis, and a vertical direction of the combiner 30 is set as a Z-axis. Here, the coordinate values of X, Y and Z directions which indicate the position of the finger can be calculated by the following formulas (1), (2) and (3). Here, in the formulas (1), (2) and (3), "pp" indicates a peak signal. For example, "RX1pp" means a signal in which a signal value indicates a peak among the RX signals detected by the detection electrode RX1.

[Formula 1]

$$X=|RX1pp+RX2pp|/2 \quad (1)$$

[Formula 2]

$$Y=|RX3pp+RX4pp|/2 \quad (2)$$

[Formula 3]

$$Z=RX0pp| \quad (3)$$

Next, the CPU 51 analyzes each coordinate value and judges whether the gesture is satisfied (step S8). Specifically, data which defines an order of change of the coordinate values is stored beforehand into the ROM 53 as judgment data for gesture. The CPU 51 judges whether the gesture is established based on whether the data which defines the order of change of the coordinate values is identical with an actual order of change of the coordinate values. It is assumed that the data which defines the order of change of the coordinate values includes a case where the coordinate values change in order of the detection electrodes RX1, RX0 and RX2, but does not include a case where the coordinate values change in order of the detection electrodes RX1, RX0 and RX1, for example. In this case, when the coordinate values change in order of the detection electrodes RX1, RX0 and RX2, the CPU 51 judges that the gesture which moves the finger from the left end to the right end of the combiner 30 is established. On the other hand, when the coordinate values change in order of the detection electrodes RX1, RX0 and RX1, the CPU 51 judges that the gesture is not established.

When the CPU 51 judges that the gesture is established (YES in step S9), the CPU 51 notifies the host computer 10 of the established gesture and the coordinate values of X, Y and Z (step S10). Also when the CPU 51 judges that the gesture is not established (NO in step S9), the CPU 51 notifies the host computer 10 of the coordinate values of X, Y and Z (step S11).

As described above, according to the present embodiment, the gesture which the operator inputs can be judged without separately providing an infrared sensor, a camera and the like to the head-up display 1. Therefore, enlargement of the head-up display 1 can be prevented and the manufacturing cost of the head-up display 1 can be reduced.

Although in the above-mentioned embodiment, the electric field change output layer 36 include five detection electrodes, the number of detection electrodes is not limited to this. For example, the electric field change output layer 36 may include the detection electrodes of m rows×n columns (m and n are natural numbers equal to or more than 2).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A combiner that combines an image which a projector projects with natural light, comprising:
a first surface that inputs the natural light from a side opposite to an operator side;
a second surface that is opposite to the first surface, and that inputs the image projected by the projector disposed on the operator side;
a plurality of reflection layers that reflect the image projected by the projector;
an electric field generation layer that generates an electric field for detection of a three-dimensional gesture operation, around the combiner; and
an output layer that outputs a voltage according to change of the electric field generated by the electric field generation layer,
wherein a single reflection layer of the plurality of reflection layers is arranged between the electric field generation layer and the output layer.

2. The combiner as claimed in claim 1, wherein the output layer includes a plurality of electrodes, a single electrode is arranged in a center of the output layer, and other electrodes are arranged at front, rear, right and left sides of the single electrode via insulating layers.

3. An operation detection device comprising:
a combiner that combines an image, which a projector projects with natural light; and
a judgment device;
the combiner including:
a first surface that inputs the natural light from a side opposite to an operator side;
a second surface that is opposite to the first surface, and that inputs the image projected by the projector disposed on the operator side;
a plurality of reflection layers that reflect the image projected by the projector;
an electric field generation layer that generates an electric field for detection of a three-dimensional gesture operation, around the combiner; and
an output layer that outputs a voltage according to change of the electric field generated by the electric field generation layer; and
the judgment device including:
a voltage supply circuit that supplies a voltage to the electric field generation layer;
a voltage input circuit that inputs a voltage from the output layer; and
a detector that detects a non-contact operation content by an operator based on a signal corresponding to a difference between the voltage supplied to the electric field generation layer and the voltage from the output layer,
wherein a single reflection layer of the plurality of reflection layers is arranged between the electric field generation layer and the output layer.

4. The operation detection device as claimed in claim 3, wherein the output layer includes a plurality of electrodes, and the detector detects the non-contact operation content of a gesture by the operator based on judgment data for the gesture, and a signal corresponding to a difference between the voltage supplied to the electric field generation layer and a voltage from each of the plurality of electrodes.

5. An operation detection device comprising:
a combiner that combines an image, which a projector projects with natural light; and
a judgment device;
the combiner including:
  a first surface that inputs the natural light from a side opposite to an operator side;
  a second surface that is opposite to the first surface, and that inputs the image projected by the projector disposed on the operator side;
  a reflection layer that reflects the image projected by the projector;
  an electric field generation layer that includes a mesh-shaped electrode pattern of insulating layers formed into quadrangles between electrodes in a first plane, and generating an electric field for detection of a three-dimensional gesture operation, around the combiner; and
  an output layer that outputs a voltage according to change of the electric field generated by the electric field generation layer, the output layer including:
    a first electrode arranged in a center of the output layer;
    a second electrode arranged at a front side of the first electrode;
    a third electrode arranged at a rear side of the first electrode;
    a fourth electrode arranged at a right of the first electrode; and
    a fifth electrode arranged at a left side of the first electrode; and wherein
each of the first electrode, the second electrode, the third electrode, the fourth electrode, and the fifth electrode are in a second plane and have a larger area than each quadrangle of the mesh-shaped electrode pattern,
the second plane is parallel to and separate from the first plane,
the judgment device including:
  a detector that detects a three-dimensional position and a three-dimensional movement of a non-contact operation by an operator based on output voltages of the first electrode, the second electrode, the third electrode, the fourth electrode, and the fifth electrode.

* * * * *